US009969831B2

(12) United States Patent
Flook et al.

(10) Patent No.: US 9,969,831 B2
(45) Date of Patent: May 15, 2018

(54) FUNCTIONALIZED ELASTOMER

(71) Applicant: The Goodyear Tire & Rubber Company, Akron, OH (US)

(72) Inventors: Margaret McGuigan Flook, Cuyahoga Falls, OH (US); Inigo Göttker genannt Schnetmann, Constance (DE); Hannes Leicht, Constance (DE); Stefan Mecking, Constance (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 243 days.

(21) Appl. No.: 14/973,769

(22) Filed: Dec. 18, 2015

(65) Prior Publication Data
US 2016/0177008 A1 Jun. 23, 2016

Related U.S. Application Data

(60) Provisional application No. 62/094,096, filed on Dec. 19, 2014.

(51) Int. Cl.
*C08F 230/06* (2006.01)
*C08F 230/08* (2006.01)
*C08F 236/06* (2006.01)
*C08F 236/14* (2006.01)
*B60C 1/00* (2006.01)
*C08F 4/619* (2006.01)

(52) U.S. Cl.
CPC .............. *C08F 236/06* (2013.01); *B60C 1/00* (2013.01); *B60C 1/0016* (2013.01); *C08F 230/08* (2013.01); *C08F 236/14* (2013.01); *C08F 4/619* (2013.01); *C08F 4/61908* (2013.01)

(58) Field of Classification Search
CPC ....... B60C 1/00; B60C 1/0016; C08F 230/08; C08F 236/06; C08F 236/14; C08F 4/619; C08F 4/61908
USPC ........................................................ 526/279
See application file for complete search history.

(56) References Cited

U.S. PATENT DOCUMENTS 8,022,152 B2 9/2011 Ittel et al.
8,859,687 B2 10/2014 Mruk

FOREIGN PATENT DOCUMENTS

| CN | 103172916 A | 6/2013 |
| EP | 0189174 A1 | 7/1986 |
| FR | 1450271 A | 5/1966 |
| FR | 2669341 A1 | 5/1992 |
| GB | 1081150 | 10/1965 |
| JP | 2004-196736 A | 7/2004 |
| JP | 2004-210993 A | 7/2004 |
| WO | 2001034658 A1 | 5/2001 |
| WO | 2004007602 A2 | 1/2004 |

OTHER PUBLICATIONS

Takenaka et al. ("Polymerization of Monomers Containing Functional Silyl Groups. 6. Anionic Polymerization of 2-(Trialkoxysilyl)-1,3-butadiene", Macromolecules, vol. 22, issue 4, pp. 1563-1567).*
Takenaka et al. ("Polymerization of monomers containing functional silyl groups. 8. Catalytic hydrogenation of poly(2-silyl-substituted-1,3-butadiene)s", Macromolecules 1990, 23, 3619-3625).*
European Search Report dated Jun. 7, 2016 for Application Serial No. 15200513.
Abby R. O'Connor, et al., Polymerization of 1 3-Dienes and Styrene Catalyzed by Cationic Allyl Ni(II) Complexes, Journal of Polymer Science: Part A: Polymer Chemistry, 2010, pp. 1901-1912, vol. 48.
Abby R. O'Connor, et al., Synthesis and Reactivity of Cationic (Allyl)(arene)nickel(II) and (Allyl)(arene)palladium (II) Complexes, Organometallics, 2009, pp. 2372-2384, 28.
Abby R. O'Connor, et al., Synthesis, Characterization, and Reactivity Studies of (Cyclohexenyl)nickel(II) Complexes, Organometallics, 2010, pp. 5382-5389, 29.
Abby R. O'Connor, et al., The Mechanism of Polymerization of Butadiene by "Ligand-Free" Nickel(II) Complexes, J. Am. Chem. Soc., 2007, pp. 4142-4143, 129.
Katsuhiko Takenaka, et al., Polymerization of Monomers Containing Functional Silyl Groups, 12 a), Makromol. Chem., 1992, pp. 1943-1953, 193.
Katsuhiko Takenaka, et al., Polymerization of Monomers Containing Functional Silyl Groups. 8. Catalytic Hydrogenation of Poly(2-silyl-substituted-1,3-butadiene)s, Macromolecules, 1990, pp. 3619-3625, 23.

(Continued)

Primary Examiner — Wenwen Cai
(74) Attorney, Agent, or Firm — John De. DeLong

(57) ABSTRACT

The present invention is directed to a copolymer of 1,3-butadiene or isoprene and a monomer of formula I or formula II

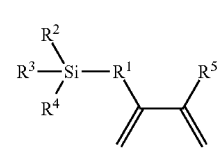

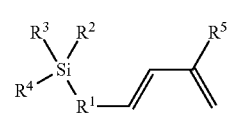

where $R^1$ is a covalent bond or C1 to C8 linear or branched alkanediyl; $R^2$, $R^3$, $R^4$ are independently C1 to C8 linear or branched alkyl or —$OR^6$, where $R^6$ is C1 to C8 linear or branched alkyl, with the proviso that at least one of $R^2$, $R^3$, and $R^4$ is —$OR^6$, and where $R^5$ is hydrogen or C1 to C8 linear or branched alkyl. The invention is further directed to a rubber composition including the copolymer, and a pneumatic tire containing the rubber composition.
The invention is further directed to a method of making such a copolymer.

10 Claims, No Drawings

(56) References Cited

OTHER PUBLICATIONS

Kiyoshi Sunada, et al., Synthesis of Polychloroprene-Silica Composites by Sol-Gel Method in the Presence of Modified Polychloroprene Containing Triethoxysilyl Group, Journal of Applied Polymer Science, 2005, pp. 1545-1552, vol. 97.

Hans J. Reich, et al., Polymerization of Monomers Containing Functional Silyl Groups. 4. Anionic Polymerization of 2-(trimethoxysilyl)1,3-butadiene, Macromolecules, 1987, pp. 2034-2035, vol. 20.

Katsuhiko Takenaka, et al., Polymerization of 1,3-dienes Containing Functional Groups: 8. Free-Radical Polymerization of 2-triethoxysilyl-1,3-butadiene, Society of Chemical Industry, 2010, pp. 891-895, Vo. 59.

Chinese Search Report (not dated) for Application Serial No. 201510949603.0.

\* cited by examiner

FUNCTIONALIZED ELASTOMER

BACKGROUND

Stereoregular diene polymers are produced and used industrially on a large scale as an important component of tire compounds. Diene polymers with high levels of stereoregularity are almost exclusively prepared with coordination polymerization catalysts, which are in general easily poisoned by polar functionalities. Because of this poisoning effect, the types of monomers that are compatible with coordination catalysts are usually limited to simple hydrocarbons. It is well known within the tire industry that the incorporation of even low levels of functionality into certain tire polymers (prepared through anionic or emulsion polymerization) significantly improves the performance of tires containing such polymers. Unfortunately, there is currently no reliable method to apply this functionalization technology to stereoregular diene polymers, but it is likely that such a polymer would show superior tire properties over known unfunctionalized polymers.

EP189174 discloses polymerization and copolymerization of 2-alkoxysilyl-1,3-butadiene monomers (by anionic or radical polymerization and with stereo- and regio-regularities typically observed for those polymerization methods).

WO2004/007602 discloses a catalyst for the polymerization of 1,4-dienes, styrene and for the copolymerization of two monomers. The characteristics of the inventive catalyst include a high degree of stereoselectivity, catalytic activity and tolerance to the presence of polar impurities. Said catalyst combines the characteristics specific to Ni-based diene polymerization catalysts (high stereoselectivity and catalytic activity) with a well-defined character and tolerance to the presence of polar substances.

Sunada et al. (*Journal of Applied Polymer Science*, Vol. 97, 1545-1552 (2005)) disclose triethoxysilyl-modified polychloroprene (CR) latex synthesized by the emulsion copolymerization of 2-(3-triethoxysilypropyl)-1,3-butadiene with chloroprene.

O'Connor et al. (*Journal of Applied Polymer Science, Part A: Polymer Chemistry*, Vol. 48, 1901-1912 (2010)) disclose polymerization of 2,3 bis(4-trifluoroethoxy-4-oxobutyl)-1,3-butadiene catalyzed by a cationic ally (Ni)II complex. Attempts to polymerize the monomer with the ester groups replaced by more basic amino and hydroxy functional groups were unsuccessful.

U.S. Pat. No. 8,022,152 discloses ethylene and allyl- or vinylsilanes efficiently copolymerized by certain late transition metal complexes containing selected bidentate or tridentate ligands.

SUMMARY

The present invention is directed to a copolymer of 1,3-butadiene or isoprene and a monomer of formula I or formula II

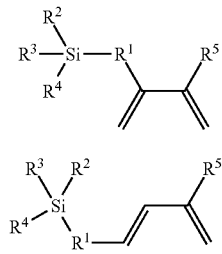

where $R^1$ is a covalent bond or C1 to C8 linear or branched alkanediyl; $R^2$, $R^3$, $R^4$ are independently C1 to C8 linear or branched alkyl or $-OR^6$, where $R^6$ is C1 to C8 linear or branched alkyl, with the proviso that at least one of $R^2$, $R^3$, and $R^4$ is $-OR^6$, and where $R^5$ is hydrogen or C1 to C8 linear or branched alkyl. The invention is further directed to a rubber composition including the copolymer, and a pneumatic tire containing the rubber composition.

The invention is further directed to a method of making such a copolymer.

DESCRIPTION

There is disclosed a copolymer of 1,3-butadiene or isoprene and a monomer of formula I or formula II

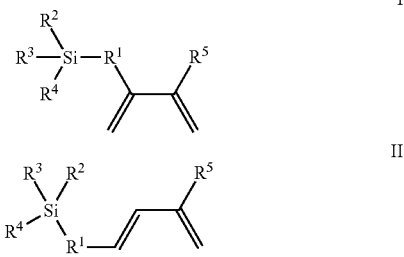

where $R^1$ is a covalent bond or C1 to C8 linear or branched alkanediyl; $R^2$, $R^3$, $R^4$ are independently C1 to C8 linear or branched alkyl or $-OR^6$, where $R^6$ is C1 to C8 linear or branched alkyl, with the proviso that at least one of $R^2$, $R^3$, and $R^4$ is $-OR^6$, and where $R^5$ is hydrogen or C1 to C8 linear or branched alkyl.

There is further disclosed a rubber composition including the copolymer, and a pneumatic tire containing the rubber composition.

There is further disclosed a method of making such a copolymer.

The copolymer is produced via polymerization of a non-functionalized diene monomer and a functionalized diene monomer.

In one embodiment, the nonfunctionalized diene monomer is 1,3-butadiene or isoprene.

In one embodiment, the functionalized diene monomer is a monomer of formula I or formula II

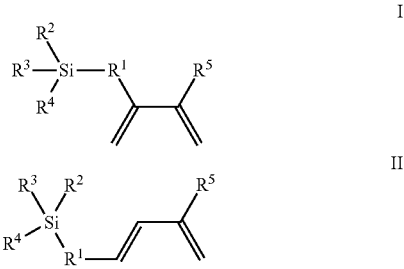

where $R^1$ is a covalent bond or C1 to C8 linear or branched alkanediyl; $R^2$, $R^3$, $R^4$ are independently C1 to C8 linear or branched alkyl or $-OR^6$, where $R^6$ is C1 to C8 linear or branched alkyl, with the proviso that at least one of $R^2$, $R^3$, and $R^4$ is $-OR^6$, and where $R^5$ is hydrogen or C1 to C8 linear or branched alkyl. In one embodiment, the functionalized monomer is 2-(3-triethoxysilylpropyl)-1,3-butadiene, 2-(3-(triethoxysilyl)propyl)-3-methyl-1,3-butadiene, 2-(triethoxysilyl)-3-methyl-1,3-butadiene, 1-(E)-(triethoxysilyl)-3-methyl-1,3-butadiene, or 1-(Z)-(triethoxysilyl)-3-methyl-1,3-butadiene.

The copolymer has a high degree of stereoregularity. In one embodiment, the copolymer has a cis 1,4 microstructure content of greater than 80 percent by weight based on the polybutadiene or polyisoprene content of the copolymer. In one embodiment, the copolymer has a cis 1,4 microstructure content of greater than 95 percent by weight based on the polybutadiene content of the copolymer.

The ratio of cis 1,4-units derived from the monomer of formula I or formula II by weight amounts to the same value as for butadiene or isoprene units. This is because there are no observed signals for the olefinic $CH_2$-group of a 3,4-incorporated unit in NMR-spectra (the intensity may be below the detection limit):

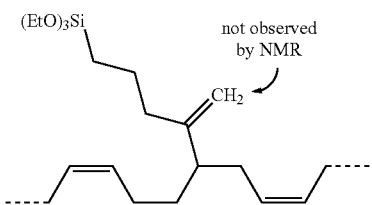

Hence, the monomer I is incorporated with essentially the same stereoregularity observed for butadiene or isoprene units. Polymers with the highest stereoregularity show up to 96 wt % of cis 1,4-units.

The copolymer has a major weight portion attributed to units derived from the nonfunctionalized monomer, and a minor weight portion attributed to units derived from the functionalized monomer. In one embodiment, the copolymer comprises from 0.1 to 40 percent by weight of units derived from the functionalized diene monomer. In one embodiment, the copolymer comprises from 0.5 to 20 percent by weight of units derived from the functionalized diene monomer. In one embodiment, the copolymer comprises from 1 to 5 percent by weight of units derived from the functionalized diene monomer.

The copolymer is produced by polymerization of the nonfunctionalized monomer and functionalized monomer in the presence of a nickel coordination catalyst. In one embodiment, the catalyst is an (allyl)(arene)Ni(II) compound. Suitable (allyl)(arene)Ni(II) compounds may be produced as described in O'Connor et al. (*Organometallics* 2009, 28 2372-2384). The catalyst is generally in the form of a cation with a suitable counteranion. In one embodiment, the counteranion is tetrakis(3,5-bis(tifluoromethyl)phenyl) borate (i.e. $BAr^F_4{}^-$). In one embodiment, the catalyst is the (allyl)(mesitylene)Ni(II)$^+$BAr$^F_4{}^-$ complex as shown in formula III

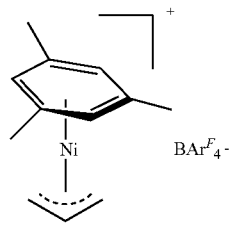

III

The polymerization using the (allyl)(arene)Ni(II) catalysts may be done following the methods as described in O'Connor et al. (*Journal of Applied Polymer Science, Part A: Polymer Chemistry*, Vol. 48, 1901-1912 (2010)). The copolymerization may be carried out by solution polymerization at a temperature ranging from 0 to 60 C. Suitable solvents for the solution polymerization include toluene, methylene chloride, and heptane, and the like.

The copolymer may be compounded into a rubber composition.

The rubber composition may optionally include, in addition to the functionalized copolymer, one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts*, 2003, 62nd edition, published by the Institute of Petroleum, United Kingdom.

The rubber composition may include silica, carbon black, or a combination of silica and carbon black.

The rubber composition may include from about 1 to about 150 phr of silica. In another embodiment, from 10 to 100 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram.

The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Rhodia, with, for example, designations of Z1165MP and Z165GR and silicas available from Degussa AG with, for example, designations VN2 and VN3, etc.

Commonly employed carbon blacks can be used as a conventional filler in combination with silica in an amount ranging from 1 to 150 phr. In another embodiment, from 10 to 100 phr of carbon black may be used. Although carbon black may be used with silica, in one embodiment, essentially no carbon black is used except for an amount required to impart black color to the tire which is from 1 to 10 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Combinations of silica and carbon black may be used in the composition. In one embodiment, the weight ratio of silica to carbon black is greater than or equal to one.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

In this example, the synthesis of a Ni(II) coordination catalyst is illustrated. The compound of formula IV was converted to the compound of formula III as follows. Compound IV (8 mmol) was combined with $NaBAr^F_4$ (8 mmol) and mesitylene (20 mmol) in 40 ml of diethyl ether in a 100 ml Schlenk tube and cooled to −78° C. After 5 minutes, 8 ml of 1 M allyl magnesium bromide in diethyl ether was dropwise added under stirring, and the temperature increased to −20° C. by exchange of the cooling bath after the addition of allyl magnesium bromide was complete. After 60 minutes at −20° C., the cooling bath was removed and the mixture warmed to 25° C. at which the ether was distilled off at 25° C. to leave a crude solid. Methylene chloride (30 ml) was then added and the mixture was agitated, followed by filtration of the solids. Heptane (10 mL) was added to the methylene chloride solution and the resulting mixture concentrated to dryness under high vacuum to leave 6.85 g of solids containing about 50% yield of the catalyst of formula III based on Ni.

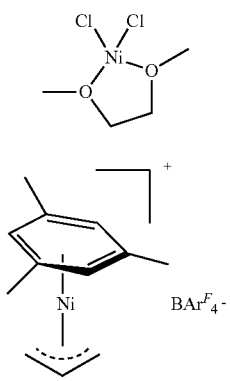

IV

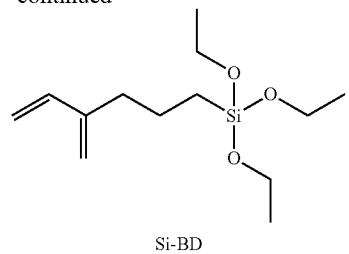

III

Examples 2-6

In these examples, the copolymerization of 1,3 butadiene and isoprene with 2-(3-(triethoxysilyl)propyl)-1,3-butadiene are illustrated. The functional monomer 2-(3-(triethoxysilyl) propyl)-1,3-butadiene was synthesized following methods as described in Sunada et al. (*Journal of Applied Polymer Science*, Vol. 97, 1545-1552 (2005).

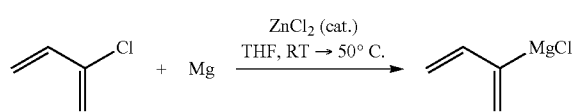

A flame dried three-neck flask was charged with 8.3 g (338.90 mmol, 3.75 equiv.) of magnesium turnings. These were layered with 20 mL THF. Subsequently, 0.1 mL of 1,2-dibromoethane as well as a solution of zinc(II) chloride were added. The zinc(II) chloride solution was prepared prior to addition by dissolving 0.93 g (6.80 mmol, cat.) of zinc(II) chloride in 8 mL THF under vigorous stirring. Additional 12 mL of THF were added. 40 g of a 50 weight % solution of chloroprene in xylene (225.90 mmol, 2.50 equiv.) was diluted with 40 mL THF. Upon addition of a few mL of the premixed chloroprene solution a slight boiling of the reaction mixture was visible. Thereafter the residual chloroprene solution was added drop-wise. Subsequently, the mixture was heated to 50° C. for 4 h and a green solution, which contained the desired product, buta-1,3-dien-2-yl-magnesiumchloride, was obtained. The solution was directly used in the following step without further purification.

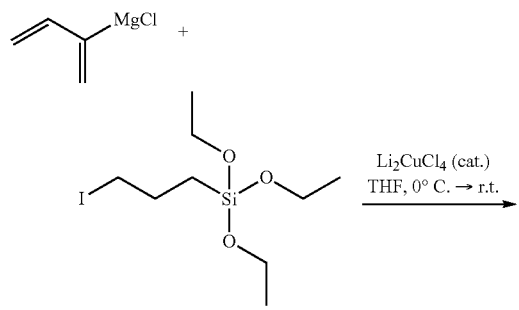

Si-BD 30.0 g of triethoxy(3-iodopropyl)silane (90.29 mmol, 1.00 equiv.) were cooled to 0° C. A red dilithium tetrachlorocuprate(II) solution (11.29 mmol, cat.) that was prepared by dissolving 960 mg lithium chloride and 1.52 g copper(II) chloride in 20 mL THF, was added. The reaction mixture was stirred at r.t. and the Grignard solution (obtained in step 1) was added until NMR-analysis of the reaction mixture showed full conversion. Subsequently, most of the solvent was removed and the black suspension was diluted with heptane (2×500 mL). Magnesium salts precipitated as black solid upon addition of heptane. The resulting suspension was filtered two times over celite. The obtained yellow solution was concentrated to 50 mL and distilled at 0.4 mbar (boiling point: 44-46° C.). 13.9 g (53.79 mmol, 60%) of the title compound (Si-BD) were obtained as a colorless liquid.

Example 2

Co-Polymerization of 1,3-butadiene and 2-(3-(triethoxysilyl)propyl)-1,3-butadiene Using Compound III in Methylene Chloride A flame-dried schlenk-flask was charged with 10 µmol of compound III and sealed with a rubber-septum. Dry methylene chloride (20 mL) was added. This solution was cooled to −78° C. and evacuated for a short period of time. 6.6 g BD were then condensed into the catalyst solution under reduced pressure. After addition of 1.2 g of 2-(3-(triethoxysilyl) propyl)-1,3-butadiene in $CH_2Cl_2$ (1 mL), the polymerization was initiated by warming the reaction mixture to 0° C. After 30 min at 0° C. the reaction mixture was decolorized, indicating decomposition of the catalyst. Therefore, further 40 µmol of compound III were added. After 4.5 h, 0.5 mL of $NEt_3$ and ca. 40 mg of BHT in 1 mL of $CH_2Cl_2$ were added to end the polymerization. Residual BD was carefully removed under reduced pressure and the polymer was precipitated in $CH_3CN$ in the presence of BHT (ca. 100 mg/100 mL). The formed polymer was dried overnight at 50° C. under reduced pressure to give 3.2 g of poly(butadiene-co-2-(3-(triethoxysilyl)propyl)-1,3-butadiene). The polymer exhibits a molecular weight of Mn=11000 g/mol and a PDI of 2.7 (GPC in THF vs. PS-standards). DSC measurements revealed a glass transition temperature of $T_g$=−93° C. NMR-experiments, including HSQC, HMBC, 1D-TOCSY, HSQC-TOCSY, DOSY, and $^{13}C-^{13}C$-INADEQUATE showed unequivocally the formation of a true copolymer with a 1,4-cis-content of 95% and a comonomer content of 7.8 mol % (37 wt %).

Example 3

Co-Polymerization of 1,3-butadiene and 2-(3-(triethoxysilyl)propyl)-1,3-butadiene Using Compound III in toluene 20 mL of toluene were added to a flame-dried schlenk-flask that was subsequently sealed with a rubber septum. A solution of compound III (7 mop in 0.3 mL of CH$_2$Cl$_2$ was added. Vacuum was applied for a short period of time to remove the traces of CH$_2$Cl$_2$. After cooling the flask to −78° C., vacuum was again applied for a short period of time. 11 g of BD were then condensed into the catalyst solution under reduced pressure and 103 mg of 2-(3-(triethoxysilyl)propyl)-1,3-butadiene were added in toluene (2 mL). The polymerization was initiated by warming the reaction mixture to 0° C. The polymerization was allowed to run at that temperature for 1.75 h. 0.5 mL of NEt$_3$ were added to end the polymerization. Residual BD was carefully removed under reduced pressure and the polymer was precipitated in MeOH in the presence of BHT (ca. 100 mg/100 mL). The formed polymer was dried overnight at 50° C. under reduced pressure to give 4.5 g of poly(butadiene-co-2-(3-(triethoxysilyl)propyl)-1,3-butadiene). The polymer exhibits a molecular weight of Mn=100000 g/mol and a PDI of 2.4 (GPC in THF vs. PS-standards). DSC measurements revealed a glass transition temperature of T$_g$=−97° C. The microstructure of the polymer was determined by NMR-analyses ($^1$H and $^{13}$C) and comprises 96% 1,4-cis-units and a comonomer content of 0.4 mol % (1.9 wt %).

Example 4

Co-Polymerization of Isoprene and 2-(3-(triethoxysilyl)propyl)-1,3-butadiene Using Compound III in Methylene Chloride In a flame dried Schlenk flask 10.0 μmol (1.00 equiv. based on Ni) of compound III were dissolved in 2.5 mL methylene chloride. The orange mixture was stirred for 1-2 min. After the addition of 1.0 mL of isoprene the reaction mixture brightened up. Then, 52 mg of 2-(3-(triethoxysilyl)propyl)-1,3-butadiene were added immediately after the addition of isoprene. The reaction mixture was stirred at r.t. for 17 h, whereupon an increase in viscosity was observed. The reaction was quenched with 0.1 mL triethylamine. An inverse precipitation was carried out by concentrating the reaction mixture to half of its volume and adding acetonitrile and BHT (100 mg BHT per 100 mL solvent) directly into the flask. Removal of the solvents and drying in vacuo overnight yielded 220 mg of a white, highly viscous polymer. The polymer exhibits a molecular weight of Mn=1600 g/mol and a PDI of 37 (GPC in THF vs. PS-standards). DSC measurements revealed a glass transition temperature of T$_g$=−54° C. The microstructure of the polymer was determined by NMR-analyses ($^1$H and $^{13}$C) and comprises 63% 1,4-cis-units and a comonomer content of 3.6 mol % (13.6 wt %).

Example 5

Co-Polymerization of Isoprene and 2-(3-(triethoxysilyl)propyl)-1,3-butadiene Using Compound III in Toluene In a flame dried Schlenk flask 2.5 mL of toluene and 1.0 mL of isoprene were mixed and 27 mg of 2-(3-(triethoxysilyl)propyl)-1,3-butadiene were added. Then, a solution of 10.0 μmol of compound III in 0.3 mL methylene chloride was added into the Schlenk flask. The reaction mixture was stirred at r.t. for 15 h, whereupon an increase in viscosity was observed. The reaction was quenched with 0.1 mL triethylamine. An inverse precipitation was carried out by concentrating the reaction mixture to half of its volume and adding acetonitrile and BHT (100 mg BHT per 100 mL solvent) directly into the flask. Removal of the solvents and drying in vacuo overnight yielded 120 mg of a white, highly viscous polymer. The polymer exhibits a molecular weight of Mn=7300 g/mol and a PDI of 2.3 (GPC in THF vs. PS-standards). DSC measurements revealed a glass transition temperature of T$_g$=−56° C. The microstructure of the polymer was determined by NMR-analyses ($^1$H and $^{13}$C) and comprises 86% 1,4-cis-units and a comonomer content of 1.6 mol % (6.1 wt %).

Example 6

Co-Polymerization of 1,3-butadiene and 2-(3-(triethoxysilyl)propyl)-1,3-butadiene Using Compound III in Toluene at Higher than 25 C and 1 Bar A solution 2-(3-(triethoxysilyl)propyl)-1,3-butadiene in 50 mL of toluene was added to a 200 mL Büchi ecoclave pressure reactor (glassware, up to 6 bar) equipped with a mechanical stirrer, a pressure burette and a thermostat. Under stirring, the reactor was evacuated until the toluene begun to boil, then butadiene (15 mL) was condensed into the reactor until a constant pressure of 1.2 bar was reached. The reactor was heated to 58° C. (i.e. 2° C. below the desired reaction temperature) while stirring the content at 750 rpm. Eventually, the pressure in the reactor rose up to 2.6 bar reaching the final temperature. Then, a solution of 10 μmol of compound III in 5 mL toluene was injected into the reactor via the pressure burette. The onset of the polymerization was evident by a 2-5° C. exotherm after injection of the catalyst solution. After 30 min polymerization time a solution of 0.5 mL triethylamine in 5 mL toluene was injected into the reactor through the pressure burette, the reactor was cooled to 25° C., and excess butadiene was carefully removed under vacuum. The polymer was precipitated in MeOH in the presence of BHT (ca. 100 mg/100 mL) and dried overnight at 50° C. under reduced pressure to give 4.3 g of poly(butadiene-co-2-(3-(triethoxysilyl)propyl)-1,3-butadiene). The polymer exhibits a molecular weight of Mn=48000 g/mol and a PDI of 2.2 (GPC in THF vs. PS-standards). The microstructure of the polymer was determined by NMR-analyses ($^1$H and $^{13}$C) and comprises 96% 1,4-cis-units and a comonomer content of 0.96 mol % (4.6 wt %).

Examples 7

In this example, the copolymerization of 1,3 butadiene with 2-(3-(triethoxysilyl)propyl)-3-methyl-1,3-butadiene is illustrated. The functional monomer 2-(3-(triethoxysilyl)propyl)3-methyl-1,3-butadiene was synthesized following procedures outlined in example 2 except that 2-chloro-3-methyl-1,3-butadiene instead of chloroprene was reacted.

Co-Polymerization of 1,3-butadiene and 2-(3-(triethoxysilyl)propyl)-3-methyl-1,3-butadiene Using Compound III in Toluene 20 mL of toluene were added to a flame-dried schlenk-flask that was subsequently sealed with a rubber septum. A solution of 10 μmol of compound III in 0.3 mL of CH$_2$Cl$_2$ was added. Vacuum was applied for a short period of time to remove the traces of CH$_2$Cl$_2$. After cooling the flask to −78° C., vacuum was again applied for a short period of time. 7.3 g of BD were then condensed into the catalyst solution under reduced pressure and 50 mg of 2-(3-(triethoxysilyl)propyl)-3-methyl-1,3-butadiene were added in toluene (2 mL). The polymerization was initiated by warming the reaction mixture to 0° C. The polymerization was allowed to run at that temperature 1.25 h, with adding further 10 µmol of compound III after 0.5 h to increase the reaction rate. 0.5 mL of $NEt_3$ were added to end the polymerization. Residual BD was carefully removed under reduced pressure and the polymer was precipitated in MeOH in the presence of BHT (ca. 100 mg/100 mL). The formed polymer was dried overnight at 50° C. under reduced pressure to give 5.1 g of poly(butadiene-co-2-(3-(triethoxysilyl)propyl)-3-methyl-1,3-butadiene). The polymer exhibits a molecular weight of Mn=71000 g/mol and a PDI of 3.3 (GPC in THF vs. PS-standards). The microstructure of the polymer was determined by NMR-analyses (including $^1H$, $^{13}C$, as well as DOSY) and comprises 96% 1,4-cis-units and a comonomer content of 0.12 mol % (0.6 wt %).

Example 8

Co-Polymerization of Isoprene and 2-(3-(triethoxysilyl)propyl)-3-methyl-1,3-butadiene Using Compound III in $C_6D_6$ on NMR-Scale 47 mg of 2-(3-(triethoxysilyl)propyl)-3-methyl-1,3-butadiene (172.5 µmol, 5.6 mol %) and 197 mg of isoprene (2893 µmol, 94.4 mol %) were dissolved in $C_6D_6$ in an NMR-tube. After addition of 4 µmol of compound III, the mixture was allowed to react at r.t. for 90 h. The solution was then quantitatively transferred into a Schlenk-tube and the solvent was removed. Subsequently, the residual polymer was washed with methanol (two times agitating with MeOH and decanting) and dried at 60° C. under reduced pressure to give 210 mg of poly(isoprene-co-2-(3-(triethoxysilyl)propyl)-3-methyl-1,3-butadiene). The microstructure of the polymer was determined by NMR-analyses ($^1H$ and $^{13}C$) and comprises 81% 1,4-cis-units and a comonomer content of 6 mol % (24 wt %).

Example 9

In this example, the copolymerization of isoprene with a 1:1.13:9.3 mixture of 1-(E)-(triethoxysilyl)-3-methyl-1,3-butadiene, 1-(E)-(triethoxysilyl)-3-methyl-1,3-butadiene, and 2-(triethoxysilyl)-3-methyl-1,3-butadiene is illustrated. The mixture of said functional monomers was obtained by reaction of 2-methyl-but-ene-3-yne with triethoxysilane in presence of catalytic amounts of tris(acetonitrile) pentamethylcyclopentadienyl ruthenium(II) hexafluorophosphate by using similar procedure as reported by Trost et al. (*Journal of the American Chemical Society*, Vol 123, 12726-12727, (2001)).

Co-Polymerization of Isoprene and a 1:1.13:9.3 mixture of 1-(E)-(triethoxysilyl)-3-methyl-1,3-butadiene, 1-(Z)-(triethoxysilyl)-3-methyl-1,3-butadiene, and 2-(triethoxysilyl)-3-methyl-1,3-butadiene Using Compound III in $C_6D_6$ on NMR-Scale To mixture of isoprene (345 mg, 5.06 mmol, 89.1 mol %) and a 1:1.13:9.3 mixture of 1-(E)-(triethoxysilyl)-3-methyl-1,3-butadiene, 1-(Z)-(triethoxysilyl)-3-methyl-1,3-butadiene, and 2-(triethoxysilyl)-3-methyl-1,3-butadiene (143 mg, 0.62 mmol, 10.9 mol %) in a NMR tube was added $C_6D_6$ (0.3 mL) to yield a 1:1.13:9.3:86.5 mixture of 1-(E)-(triethoxysilyl)-3-methyl-1,3-butadiene, 1-(Z)-(triethoxysilyl)-3-methyl-1,3-butadiene, 2-(triethoxysilyl)-3-methyl-1,3-butadiene, and isoprene in $C_6D_6$. To this mixture compound III (7.4 µmol) was added and the NMR tube was heated to 55° C. in an aluminum block while periodically measuring $^1H$ NMR spectra. These spectra indicate consumption of isoprene and of all three regio- and stereoisomers of the 1:1.13:9.3 mixture of 1-(E)-(triethoxysilyl)-3-methyl-1,3-butadiene, 1-(Z)-(triethoxysilyl)-3-methyl-1,3-butadiene, and 2-(triethoxysilyl)-3-methyl-1,3-butadiene. After 66 h at 55° C. the ratio of the remaining 1-(E)-(triethoxysilyl)-3-methyl-1,3-butadiene, 1-(Z)-(triethoxysilyl)-3-methyl-1,3-butadiene, 2-(triethoxysilyl)-3-methyl-1,3-butadiene, and isoprene was 1:0.32:6.81:76.57 while 78% of the initially present isoprene had been copolymerized. These data indicate that isoprene is polymerized at a similar rate (but somewhat faster) than 2-(triethoxysilyl)-3-methyl-1,3-butadiene and 1-(Z)-(triethoxysilyl)-3-methyl-1,3-butadiene whereas 1-(E)-(triethoxysilyl)-3-methyl-1,3-butadiene is polymerized distinctively slower than isoprene. After 66 h reaction time at 55° C. the sample was transferred to a Schlenk-tube, all volatiles were removed under vacuum ($10^{-3}$ mbar), the residue was washed with methanol, and residual solvent was removed in vacuum (10-3 mbar, 25-55° C.) to leave 356 mg (73% yield based on mass) of a copolymer which contains ca 8.4 mol % (28.4 wt %) incorporated triethoxysilyl-3-methyl-1,3-butadienes, and 83% 1,4-cis-units.

Example 10

Co-Polymerization of 1,3-butadiene and a 1:1.13: 9.3 mixture of 1-(E)-(triethoxysilyl)-3-methyl-1,3-butadiene, 1-(Z)-(triethoxysilyl)-3-methyl-1,3-butadiene, and 2-(triethoxysilyl)-3-methyl-1,3-butadiene Using Compound III in Toluene A solution of a 1:1.13:9.3 mixture of 1-(E)-(triethoxysilyl)-3-methyl-1,3-butadiene, 1-(Z)-(triethoxysilyl)-3-methyl-1,3-butadiene, and 2-(triethoxysilyl)-3-methyl-1,3-butadiene (600 mg, 2.60 mmol) in 50 mL of toluene was added to a 200 mL Büchi ecoclave pressure reactor (glassware, up to 6 bar) equipped with a mechanical stirrer, a pressure burette and a thermostat. The reactor was cooled to −20° C. and evacuated until the toluene begun to boil, then butadiene (20 mL) was condensed into the reactor. The reactor was heated to 28° C. (i.e. 2° C. below the desired reaction temperature) while stirring the content at 750 rpm. Then, a solution of 10 µmol of compound III in 5 mL toluene was injected into the reactor via the pressure burette. The onset of the polymerization was evident by a 2° C. exotherm after injection of the catalyst solution. After 30 min polymerization time additional 10 µmol of compound III, after 60 min polymerization time additional 15 µmol of compound III were added as toluene solution via the pressure burette. The total polymerization time was 2 h at 30° C. After that time a solution of 0.5 mL triethylamine in 5 mL toluene was injected into the reactor through the pressure burette, the reactor was cooled to 25° C., and excess butadiene was carefully removed under vacuum. The polymer was precipitated in MeOH in the presence of BHT (ca. 100 mg/100 mL) and dried overnight at 50° C. under reduced pressure to give 14.6 g of poly[butadiene-co-(1-(triethoxysilyl)-3-methyl-1, 3-butadiene)-co-(2-(triethoxysilyl)-3-methyl-1,3-butadiene)]. The polymer exhibits a molecular weight of Mn=50000 g/mol, a PDI of 3.2 (GPC in THF vs. PS-standards), and a Tg=−97° C. The microstructure of the polymer was determined by NMR-analyses ($^1H$ and $^{13}C$) and comprises 95% 1,4-cis-units and a comonomer content of 0.92 mol % (4.05 wt %).

What is claimed is:

1. A copolymer of a monomer selected from the group consisting of 1,3-butadiene and isoprene, and a monomer selected from the group consisting of monomers of formula I and formula II

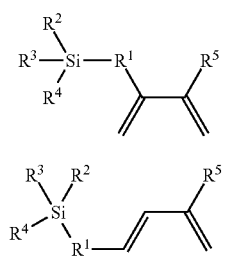

where $R^1$ is a covalent bond or C1 to C8 linear or branched alkanediyl; $R^2$, $R^3$, $R^4$ are independently C1 to C8 linear or branched alkyl or $OR^6$, where $R^6$ is C1 to C8 linear or branched alkyl, with the proviso that at least one of $R^2$, $R^3$, and $R^4$ is $—OR^6$, and where $R^5$ is hydrogen or C1 to C8 linear or branched alkyl; wherein the copolymer comprises at least 80 percent by weight of cis 1,4 microstructure content based on the polyisoprene or polybutadiene content of the polymer, and the weight ratio of cis 1,4-units derived from the monomer of formula I or formula II amounts to the same value as for the 1,3-butadiene or the isoprene units.

2. The copolymer of claim 1, comprising from 0.1 to 40 percent by weight of units derived from the monomer of formula I or formula II.

3. The copolymer of claim 1, comprising from 0.5 to 20 percent by weight of units derived from the monomer of formula I or formula II.

4. The copolymer of claim 1, comprising from 1 to 5 percent by weight of units derived from the monomer of formula I or formula II.

5. The copolymer of claim 1, wherein the monomer of formula I is selected from the group consisting of 2-(3-(triethoxysilyl)propyl)-1,3-butadiene, 2-(3-(triethoxysilyl)propyl)-3-methyl-1,3-butadiene, and 2-(triethoxysilyl)-3-methyl-1,3-butadiene, and the monomer of formula II is selected from the group consisting of 1-(E)-(triethoxysilyl)-3-methyl-1,3-butadiene and 1-(Z)-(triethoxysilyl)-3-methyl-1,3-butadiene.

6. A rubber composition comprising the copolymer of claim 1.

7. A pneumatic tire comprising the rubber composition of claim 6.

8. A method of making a copolymer, comprising the step of polymerizing a monomer selected from the group consisting of 1,3-butadiene and isoprene and a monomer of formula I or formula II in the presence of an (allyl)(arene) Ni(II) polymerization catalyst

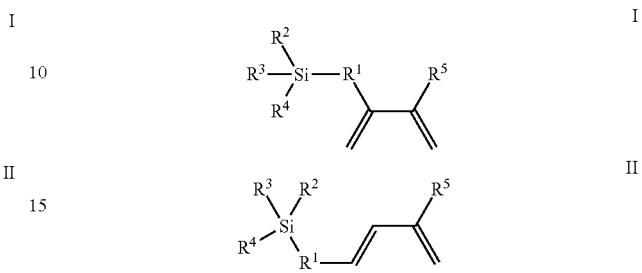

where $R^1$ is a covalent bond or C1 to C8 linear or branched alkanediyl; $R^2$, $R^3$, $R^4$ are independently C1 to C8 linear or branched alkyl or $—OR^6$, where $R^6$ is C1 to C8 linear or branched alkyl, with the proviso that at least one of $R^2$, $R^3$, and $R^4$ is $—OR^6$, and where $R^5$ is hydrogen or C1 to C8 linear or branched alkyl.

9. The method of claim 8, wherein the monomer of formula I is selected from the group consisting of 2-(3-(triethoxysilyl)propyl)-1,3-butadiene, 2-(3-(triethoxysilyl)propyl)-3-methyl-1,3-butadiene, and 2-(triethoxysilyl)3-methyl-1,3-butadiene, the monomer of formula II is selected from the group consisting of 1-(E)-(triethoxysilyl)-3-methyl-1,3-butadiene and 1-(Z)-(triethoxysilyl)-3-methyl-1,3-butadiene.

10. The method of claim 8 wherein the polymerization catalyst is of formula III

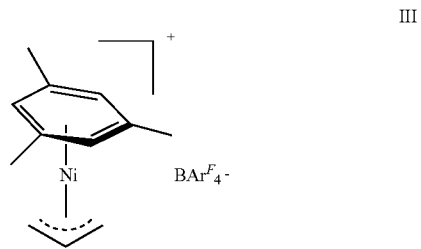

where $BAr^F_4{}^-$ is tetrakis(3,5-bis(trifluoromethyl)phenyl)borate.